United States Patent [19]

Miyashita

[11] Patent Number: 5,301,260
[45] Date of Patent: Apr. 5, 1994

[54] INFERENCE PROCESSOR USING DATA CONSISTENCY HOLDER

[75] Inventor: Kazuo Miyashita, Osaka, Japan

[73] Assignee: Matsushita Electric Industrial, Co., Ltd., Tokyo, Japan

[21] Appl. No.: 908,884

[22] Filed: Jul. 7, 1992

Related U.S. Application Data

[63] Continuation of Ser. No. 563.558, Aug. 6, 1990, abandoned.

[51] Int. Cl.⁵ .............................................. G06F 15/18
[52] U.S. Cl. ........................................ 395/54; 395/51; 395/11
[58] Field of Search ..................... 395/54, 51, 11; 364/200

[56] References Cited

U.S. PATENT DOCUMENTS

| | | | |
|---|---|---|---|
| 4,729,096 | 3/1988 | Larson | 364/200 |
| 4,951,225 | 8/1990 | Lee et al. | 364/513 |
| 5,043,914 | 8/1991 | Nishiyama et al. | 395/51 |
| 5,197,116 | 3/1993 | Kotoh et al. | 395/51 |

*Primary Examiner*—Allen R. MacDonald
*Assistant Examiner*—Georege Davis
*Attorney, Agent, or Firm*—Wenderoth, Lind & Ponack

[57] ABSTRACT

Disclosed is an inference processor having a compiler-type rule processor and an interpreter-type rule processor. The compiler-type rule processor includes a rule file for storing user-defined rules, a rule compiler for expanding the rules into a rule network, a production memory for storing compiled rules, a working memory for storing intermediate inference processing results, and an inference engine which uses these components for inference processing. The interpreter-type rule processor includes a rule file for storing user-defined rules, a rule interpreter for successively interpreting these rules, a production memory for storing interpreted rules, an inference engine which uses the production memory for inference processing, and a working memory for storing intermediate inference processing results. The rule compiler automatically generates from the rule files a data consistency holder to maintain the consistency of data used in common by the compiler-type rule processor and the interpreter-type rule processor.

6 Claims, 9 Drawing Sheets

```
% object    local data {
                int    number ;
            };
```

```
% shared object    global data {
                    int    number ;
                };
```

INFERENCE PROCESSOR USING DATA CONSISTENCY HOLDER

This application is a continuation of now abandoned application Ser. No. 07/563,558, filed on Aug. 6, 1990.

BACKGROUND OF THE INVENTION

1. Field of the Invention

The present invention relates to an inference processor in a production system which may be used as an expert system in the field of artificial intelligence.

2. Description of the Prior Art

A number of expert systems which apply artificial intelligence technologies have been developed to implement on computers the specialized and experiential knowledge of specialists in one or more fields to the resolution of specific problems. A large proportion of these systems are known as production systems, and express expert knowledge using rules with an if-then condition-conclusion logic structure.

A typical production system is described below with reference to FIGS. 1 and 2.

FIG. 1 shows the construction of a conventional compile-type inference processor (production system). In FIG. 1, 72 is a rule file used to store expert knowledge as rules in the file; 73 is a rule compiler which compiles the rules written to the rule file 72 into a network of rules to enable high speed inference processing using these rules; 74 is a production memory used to store the network and the intermediate status of inference process; 75 is a working memory for storing the intermediate results of inference processing; and 76 is an inference engine. The inference engine 76 stores the procedure which recognizes rules matching with the status of the working memory 75, and updates the production memory 74 and the working memory 75 by rule execution.

A production system thus constructed operates as described below. The knowledge believed to be applied by an expert in executing his daily tasks is collected by knowledge engineer (KE) through interviews and other methods, formulated into a series of if-then structure rules, and stored in the rule file 72. In order to construct a practical production system that is made up of these rules, it is necessary to minimize the amount of time required for the inference process. This is accomplished by using the rule compiler 73 to compile rules into a network and to generate the means for operating this network. The most efficient and widely used algorithm in these rule compilers is the Rete Match Algorithm (cf. Forgy, C. L.: Rete: A Fast Algorithm for the Many Pattern/Many Object Pattern Matching Problem, Artificial Intelligence 19, 1982). The Rete Match Algorithm shares conditional elements which happen to appear in some parts of rules, generates a network holding memory to store the intermediate states of inference processing, and stores this network in the production memory 74 in order to enable high speed evaluation of the If part of the rules. The inference engine 76 is generated as a means of processing this generated network at high speed. The inference engine 76 is a means of recognizing applicable rules at high speed by applying updated (modified) data in the working memory 75 to the network in the compiled production memory 74 one at a time as tokens, and updating the contents of the production memory 74 or the status of the network in the production memory 74 by invoking one of the rules to advance the inference process.

FIG. 2 depicts the construction of a conventional interpreter-type inference (production) system.

In FIG. 2, 77 is a rule file which stores expert knowledge formulated as rules; 78 is a rule interpreter/manager which interprets the rules in the rule file 77 in a memory of a computer; 79 is a production memory used to store the interpreted rules; 80 is a working memory which stores the intermediate results of inference processing; and 81 is an inference engine which recognizes rules in the production memory 79 that match the status of the working memory 80, and contains the procedures for updating the production memory 79 and the working memory 80 by applying those rules. A production system thus constructed operates as described below.

The knowledge believed to be applied by an expert in executing his daily tasks is gathered by knowledge engineer (KE) through interviews and other methods, formulated into a series of if-then structure rules, and stored in the rule file 77; this is the same as applies to the compiled rule processor described above. In order to make an inference using these rules and dynamically handle the rules during the inference procedure, the rule interpreter/manager 78 is used to expand rules into a network or list in the production memory 79. The inference engine 81 is a general-purpose means of referencing the generated production memory 79 and working memory 80, and is constant regardless of the contents of the production memory 79. When the inference engine 81 recognizes an applicable rule, the production memory 79 and the working memory 80 are updated by invoking that rule, thus advancing the inference procedure.

However, a compiled rule processor as shown in FIG. 1 achieves high speed inference processing by first converting all rules representing the knowledge used in the inference process to a network by means of a rule compiler 73 to efficiently manage the rules. This creates the problem of making it difficult to change the knowledge that is used for inference processing during execution of the inference process. The reasons for this are described below.

Specifically, in order to enable high speed inference processing, the inference engine 76 contains a procedure enabling high speed processing of a network into which the rules included in the rule file 72, which is the object of the inference operation, are compiled, rather than a general-purpose procedure defining the processing sequence for a general network. Therefore, it is necessary to change the procedure of the inference engine 76 itself, convert the procedure to a computer executable form and link it to other procedures being executed in order to continue inference processing without causing inferential contradictions while changing the rules during inference processing, but this process is extremely complicated.

With the construction as shown in FIG. 2, the use of a general-purpose inference engine 81 makes knowledge changes relatively simple but at the cost of a significant decrease in the speed of inference processing compared with the compiled rule processor described above. The reasons for this decrease are described below.

Specifically, with the inference engine 76 in a compiled inference processor wherein the inference engine 76 is restricted to specific inference rules, when there is a change in the data in the working memory 75, all rules affected by this change can be completely extracted before inference processing begins for all data in the working memory 75, thereby eliminating the need for unnecessary examinations during the inference process. However, in a general-purpose inference engine 81, it is not possible to obtain this information relating to the rules in advance of inference processing, thereby increasing the number of examinations required during inference processing and making it difficult to enable high speed inference processing.

SUMMARY OF THE INVENTION

Accordingly, the present invention has been developed to resolve the above-described problems, and an object of the present invention is to provide an inference processor which is also able to easily change the knowledge used in the inference process while executing high speed inference processing.

An inference processor according to the present invention comprises an interpreter-type rule processor which easily enables dynamic operation of knowledge, a compiler-type rule processor which enables high speed inference processing, and a data consistency holder which maintains the consistency of the working memory data which are in common to the interpreter-type rule processor and the compiler-type rule processor.

By means of the construction mentioned above, the inference processor according to the present invention is able to manage by means of the interpreter-type rule processor dynamic knowledge for which addition, change, or removal is expected during the inference process, and is able to execute high speed inference processing by means of the compiler-type rule processor with fixed knowledge which is not subject to dynamic operation described above. Operation to the working memory shared by the two types of rule processors is passed by the data consistency holder to the two rule processors to enable inference processing by the two rule processors without contradictions.

As a result, high speed inference processing is enabled while enabling dynamic operation of rule changes during the inference process.

One feature of this inference processor is that is can use two types of inference mechanisms in solving a problem: a compiler-type rule processor which is suitable for time critical problems like process control applications and an interpreter-type rule processor which is suitable for problems where the knowledge of the domain is not fixed but flexible. Most all realistic problems require both type of inferences because the consist of different types of small problems.

To make it possible for both the compiler-type rule processor and the interpreter-type rule processor to work in a unified manner, the data consistency holder plays a central role. The problem is that how to keep the working memories of both rule processors free from contradictions. To realize that, the data consistency holder is created by the rule compiler. The rule compiler checks the rule files for both the compiler-type rule processor and the interpreter-type rule processor and finds the data which is used by both types of rule processors in common. Then, the rule compiler produces the programs which do the following job: When the rule processor is switched from the compiler-type to the interpreter-type, it checks all common data in the working memory of the compiler-type rule processor and copies the contents to the working memory of the interpreter-type rule processor. When the rule processor is switched from the interpreter-type to the compiler-type, it checks all common data in the working memory of the interpreter-type rule processor and copies the contents to the working memory of the compiler-type rule processor.

This program which is created by the rule compiler comprises the data consistency holder.

BRIEF DESCRIPTION OF THE DRAWINGS

The present invention will become more fully understood from the detailed description given below and the accompanying drawings, throughout which like parts are designated by like reference numerals, and wherein.

DETAILED DESCRIPTION OF THE PREFERRED EMBODIMENTS

Figure 1:
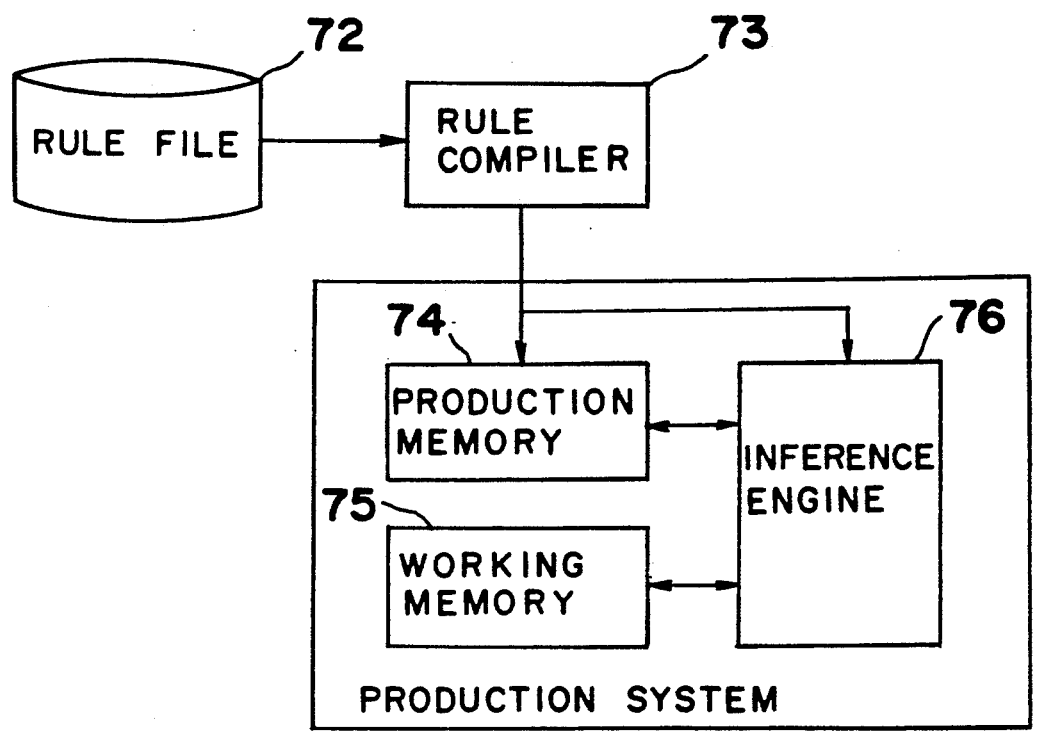
FIG. 1 is a block diagram of a conventional compiler-type inference processor.
Figure 2:
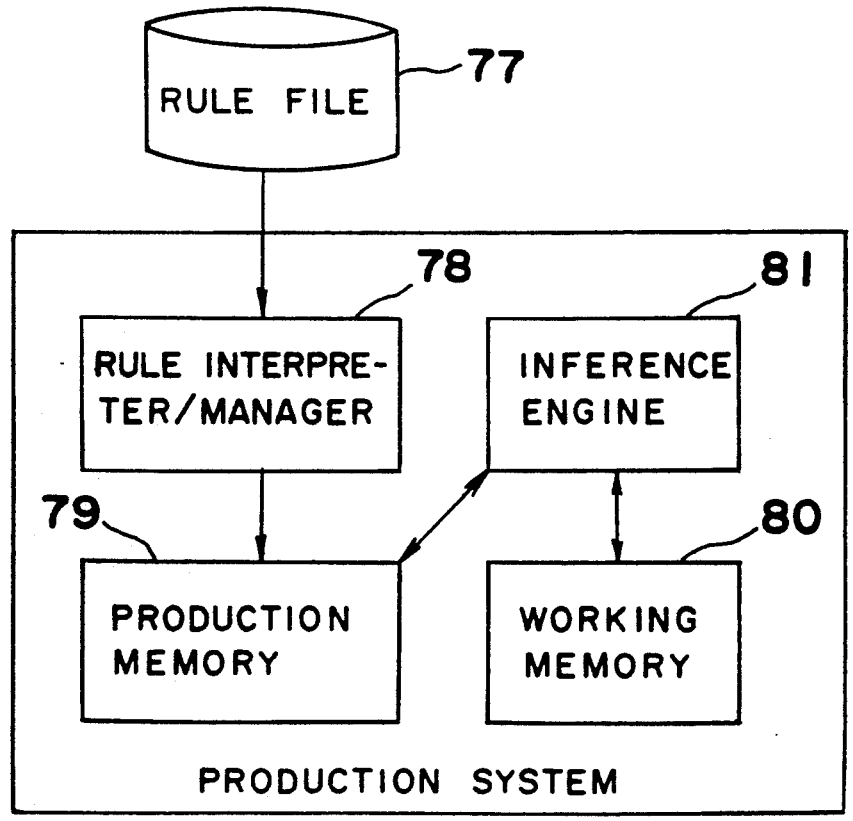
FIG. 2 is a block diagram of a conventional interpreter-type inference processor.
Figure 3:
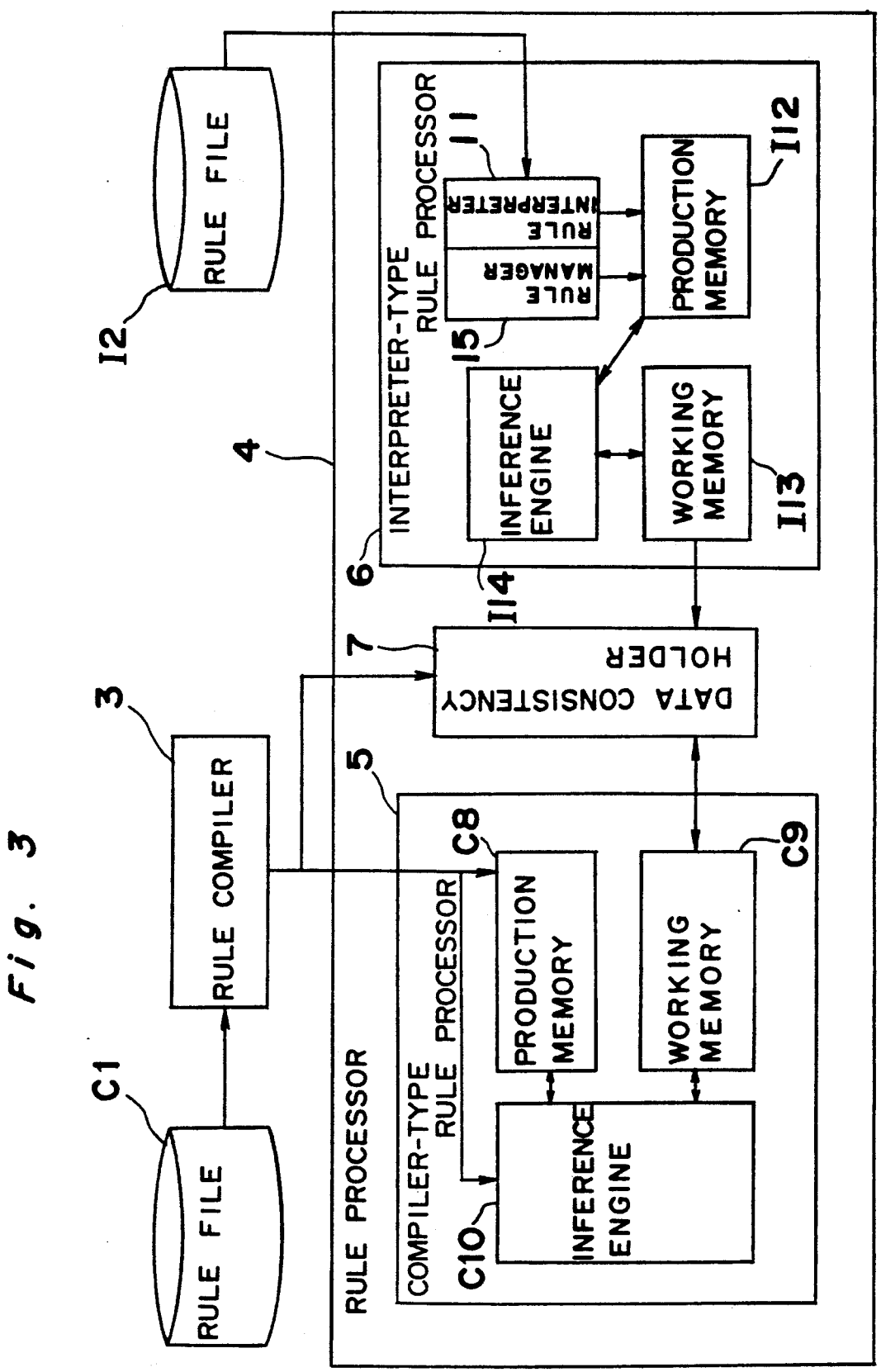
FIG. 3 is a block diagram of an inference processor according to a first embodiment of the present invention.

Referring now to the drawings, there is shown in FIG. 3 a functional block diagram of an inference processor according to the present invention. In FIG. 3, reference numeral C1 is a rule file which stores expert knowledge used by a compiler-type rule processor 5 described below in a secondary memory device in a computer in the form of if-then statements; I2 is a rule file which stores expert knowledge used by an interpreter-type rule processor 6 described below in a secondary memory device in a computer in the form of if-then statements; 3 is a rule compiler which converts the expert knowledge stored in the rule file C1 into a rule network to enable high speed inference processing, and which generates a code used to maintain consistency between data used by the compiler-type rule processor and the interpreter-type rule processor; 4 is a rule processor which uses the knowledge stored in the rule file C1 and the rule file I2 for inference processing; 5 is a compiler-type rule processor which executes high speed inference processing using the rule file C1; 6 is the interpreter-type rule processor which executes inference processing while managing knowledge changes during the inference process using the rule file I2; 7 is a data consistency holder used to assure consistency in the data used in common by both the compiler-type rule processor 5 and the interpreter-type rule processor 6; C8 is a production memory which stores the knowledge converted to a network by the rule compiler 3 in the primary memory in the computer; C9 is a working memory which stores the intermediate results of the inference process in the compiler-type rule processor 5; C10 is an inference engine which executes inference processing based on information from the production memory C8 and the working memory C9; 11 is a rule interpreter which implements the expert knowledge stored in the rule file I2 in primary computer memory; I12 is a production memory which stores the expert knowledge implemented by the rule interpreter 11 in primary computer memory; I13 is a working memory which stores the intermediate results of the inference process in the interpreter-type rule processor 6; I14 is an inference engine which executes inference processing based on information from the production memory I12 and the working memory I13; 15 is a rule manager which dynamically changes the rules used in inference processing by managing the production memory I12 during inference processing by the interpreter-type rule processor 6.

The operation of the inference processor having the above-described construction is discussed herein below with reference to FIGS. 3, 4, and 5.

Figures 4, 5:
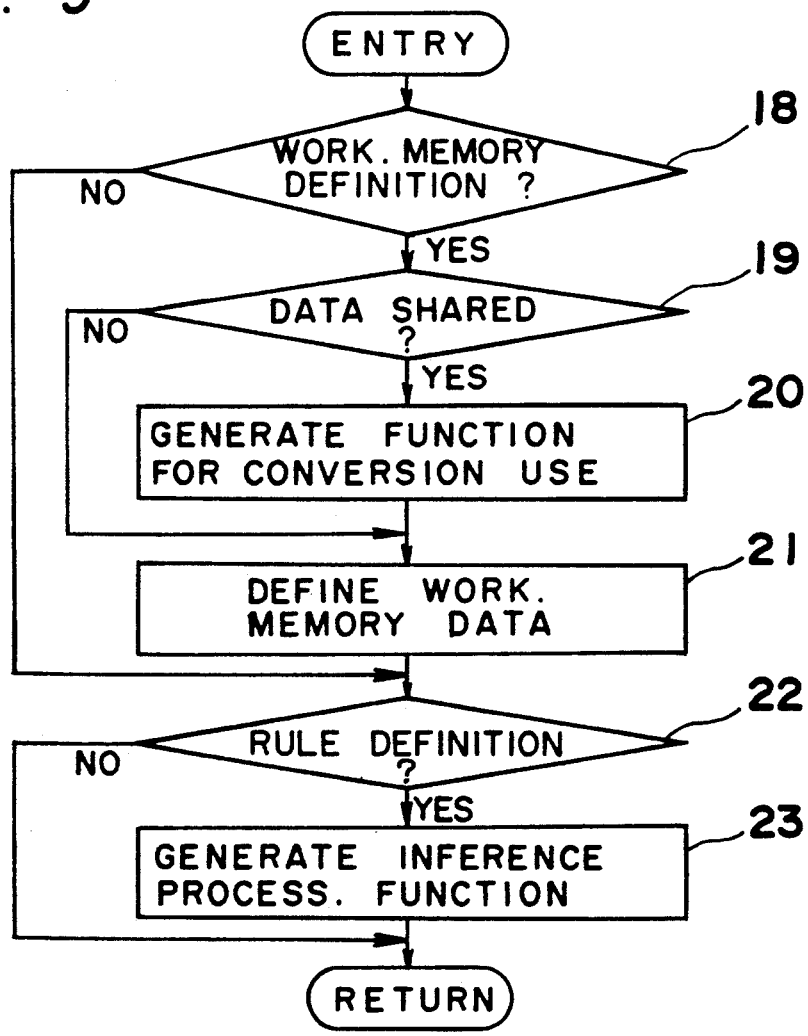
FIG. 4 is a view showing a sample working memory definition in the compiler-type rule processor of the inference processor.
FIG. 5 is a flow chart showing the operation of the rule compiler of the inference processor.

FIG. 4 shows a sample statement used for data definition in the rule file C1. In addition to the expert knowledge stored in the if-then structure format in the rule file C1, it is necessary to store information for the definitions relating to the data used therein. Data used for inference processing include two types. A definition for a first type, which is used only by the compiler-type rule processor 5, is shown in reference numeral 16; the statement "%object" defines the datum as a local data type. A definition for a second type is shown in 17; this definition type is used for data used for inference processing by both the compiler-type rule processor 5 and the interpreter-type rule processor 6; the statement "%shared_object" is used to identify global data elements.

FIG. 5 is a flow chart of the procedure followed by the rule compiler 3 to process the rule file C1 to enable inference processing while maintaining consistency in the data defined by structure 17 in the compiler-type rule processor 5 and the interpreter-type rule processor 6.

The first step is to determine whether the address currently being processed in the rule file C1 defines the working memory data used for inference processing (step 18). If the working memory data is defined, it is determined whether the data is shared with the interpreter-type rule processor 6 (step 19). If the data is shared with the interpreter-type rule processor 6, a function converting the data to the data types used by the interpreter-type rule processor 6 and the compiler-type rule processor 5 is generated (step 20). These generated functions are collected, and are compiled and linked with other modules during inference processing, thus forming the data consistency holder 7. Next, the data is defined as working memory data used by the compiler-type rule processor 5 together with the data not shared with the interpreter-type rule processor 6 (step 21). If the address in rule file C1 currently being processed does not define working memory data, it is determined whether a rule is defined (step 22). If a rule is defined, the rule is expanded into a network, and an inference processing function enabling high speed processing of the network is generated (step 23). These inference processing functions are also collected, and during inference processing are compiled and linked with other modules, thus forming the production memory C8. The generated data consistency holder 7 functions to maintain consistency in the data shared by the compiler-type rule processor 5 and interpreter-type rule processor 6 during inference processing by matching the data when the data consistency holder 7 is started by the compiler-type rule processor 5 and the interpreter-type rule processor 6 after inference processing is completed by both.

According to the preferred embodiment described herein above, a compiler-type rule processing method excelling in high speed processing and an interpreter-type rule processing method excelling in rule management can be easily combined in a single inference process by providing a compiler-type rule processor, which comprises a rule file for storing user-defined rules, a rule compiler for expanding the rules into a rule network and automatically generating a data consistency holder from the rule file to maintain consistency in the data shared by the compiler-type rule processor and the interpreter-type rule processor, a production memory for storing the compiled rules, a working memory for storing intermediate inference processing results, and an inference engine which uses these components for inference processing, and an interpreter-type rule processor, which comprises a rule file for storing user-defined rules, a rule interpreter for successively interpreting these rules, a production memory for storing the contents of the interpreted rules, an inference engine which uses the production memory for inference processing, and a working memory for storing intermediate inference processing results, and using a data consistency holder to maintain the consistency of data used in common by the compiler-type rule processor and the interpreter-type rule processor.

A second embodiment of the present invention is described herein below.

Figure 6:
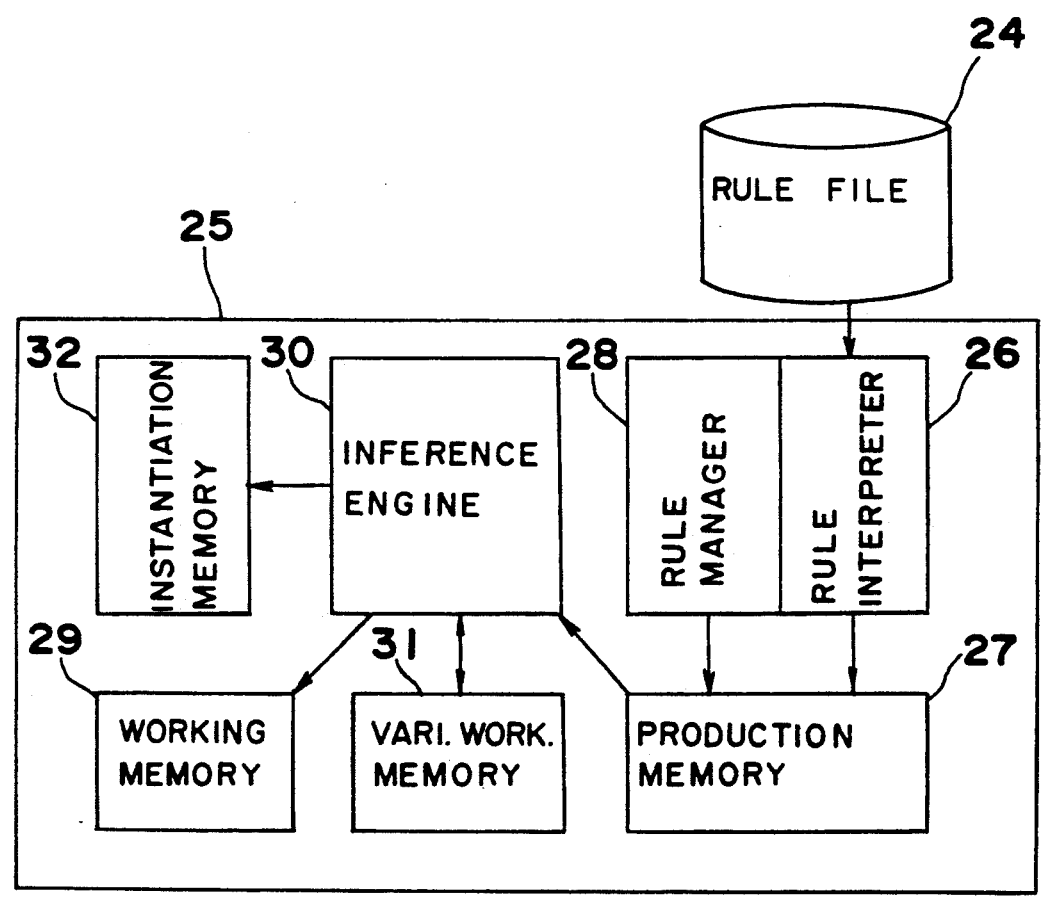
FIG. 6 is a block diagram of an interpreter-type rule processor according to a second embodiment of the present invention.

FIG. 6 is a functional block diagram of an interpreter-type rule processor in an inference processor according to a second embodiment of the present invention wherein 24 is a rule file which stores expert knowledge in a secondary memory device in a computer in the form of if-then statements; 25 is an interpreter-type rule processor which executes inference processing while managing knowledge changes during the inference process using the rule file 24; 26 is a rule interpreter which implements the expert knowledge stored in the rule file 24 in primary memory in the computer; 27 is a production memory which stores the knowledge implemented by the rule interpreter 26 in the primary memory in the computer; 28 is a rule manager which during inference processing by the interpreter-type rule processor 25 dynamically changes the rules used in inference processing by managing the production memory 27; 29 is a working memory which stores the intermediate results of the inference process in the compiler-type rule processor 25 in primary memory; 30 is an inference engine which executes inference processing based on information from the production memory 27 and the working memory 29; 31 is a variable working memory which stores the information in the updated working memory as a result of inference processing by the inference engine 30; 32 is an instantiation memory which stores sets of rules evaluated as invokable as a result of the inference processing by the inference engine 30. FIG. 6 thus shows the detailed contents of the interpreter-type rule processor 6 in FIG. 3.

The inference processor constructed as thus described operates as follows.

Figure 7:
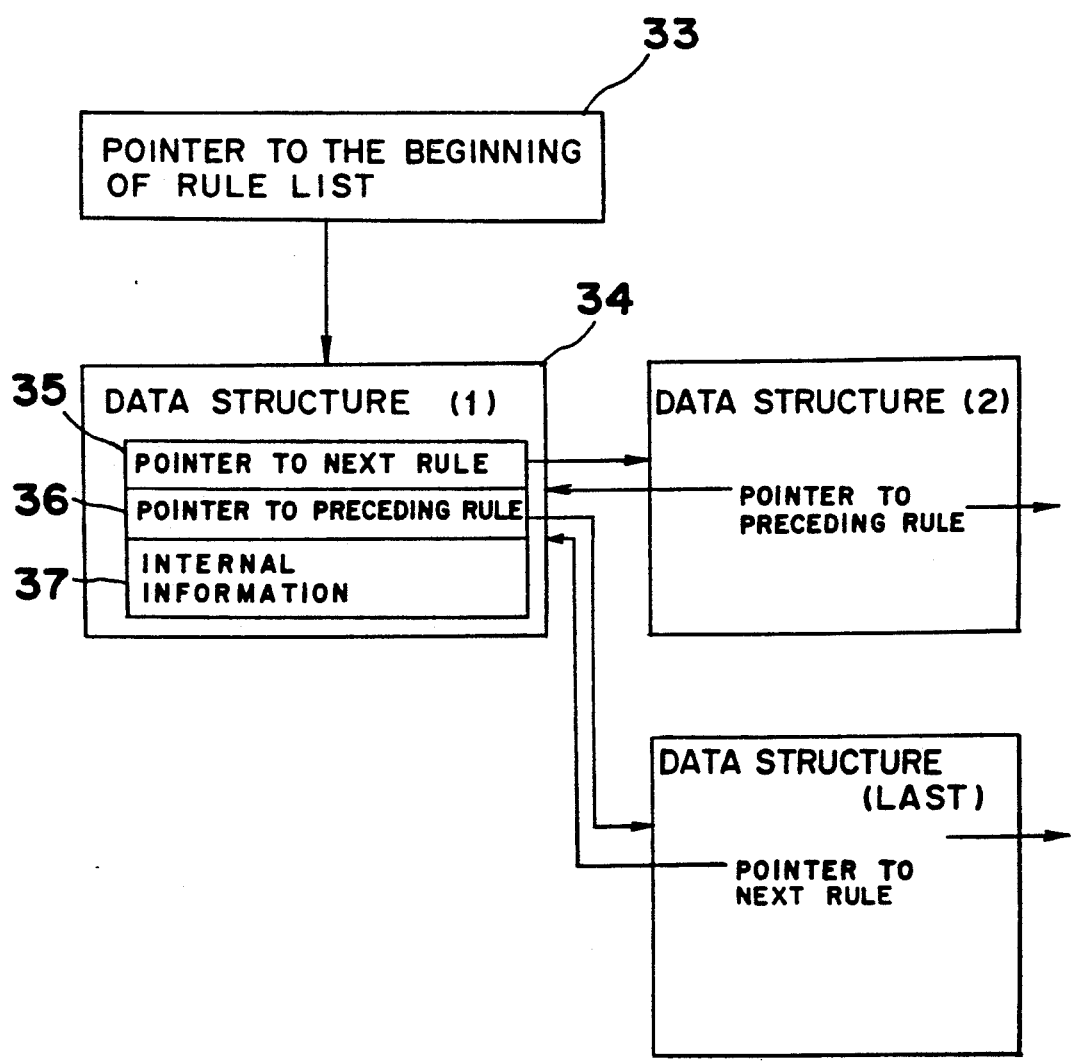
FIG. 7 is a block diagram of a data structure of a rule in the interpreter-type rule processor of the inference processor.

FIG. 7 shows the internal structure of the production memory 27 shown in FIG. 6 wherein 33 is a pointer to the beginning of a data structure for a rule contained in the production memory 27, 34 is a data structure used to express the data for each rule in primary computer memory; 35 is a pointer to the data structure 34 in the production memory 27 following the data structure wherein the pointer is contained; 36 is a pointer to the data structure in the production memory 27 preceding the data structure wherein the pointer is contained; and 37 is a range wherein is stored the internal information of a rule written to the conditional or conclusion part of the rule. By using this construction, it is possible to easily access rules contained in the production memory 27 by following the pointers 35, 36.

Figure 8:
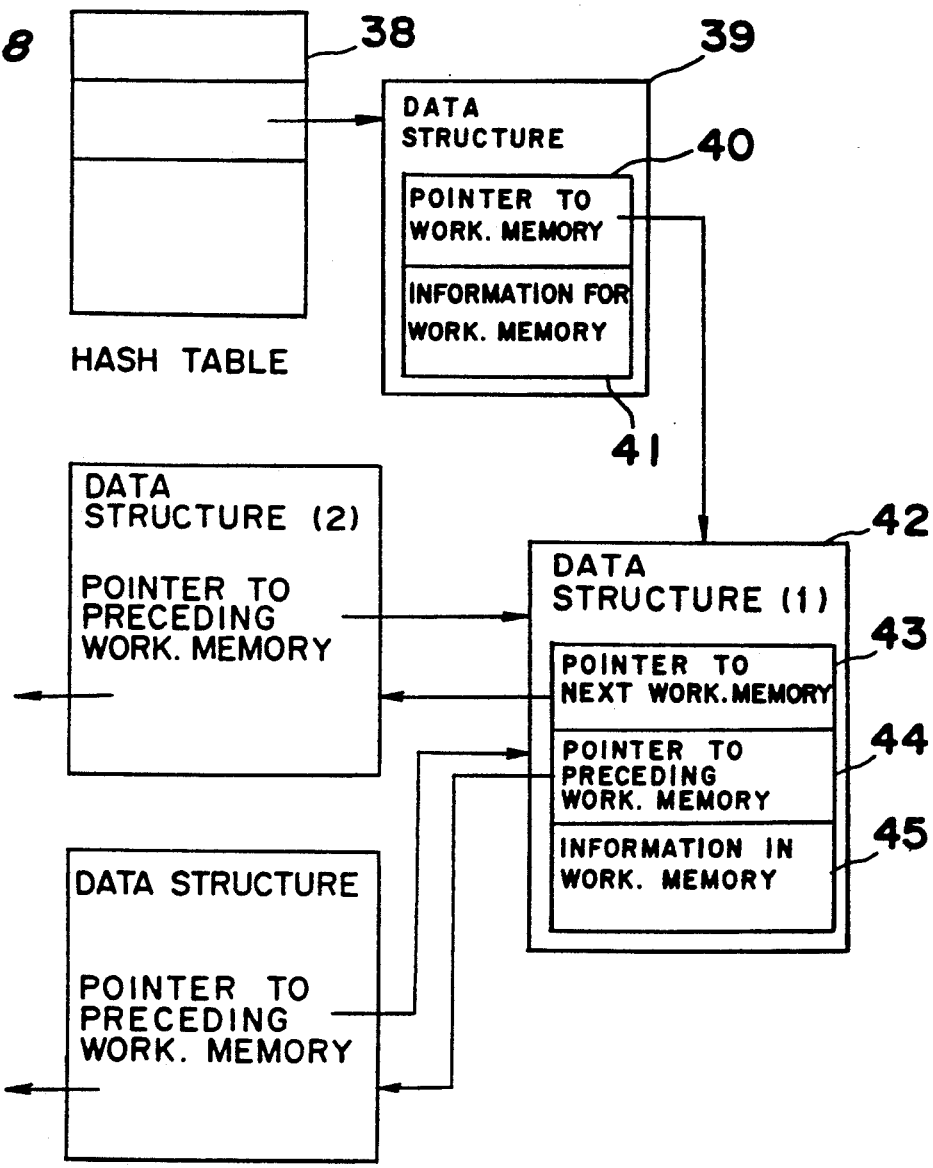
FIG. 8 is a block diagram of a data structure of a working memory in the interpreter-type rule processor of the inference processor.

FIG. 8 shows the internal construction of the working memory 29 shown in FIG. 6 wherein 38 is a Hash table for efficient management of names provided to the working memory; 39 is a data structure expressing each attribute definition of the working memory in primary memory; 40 is a pointer to a data structure at the beginning of the working memory associated with the data structure 39 of the working memory attribute definition; 41 is a range wherein is stored definition information for the working memory; 42 is a data structure expressing the information in the working memory in primary computer memory; 43 is a pointer to the working memory in the working memory 29 following the working memory wherein the pointer is contained; 44 is a pointer to the working memory in the working memory 29 preceding the working memory wherein the pointer is contained; and 45 is a range wherein is stored the internal information of the working memory.

Figure 9:
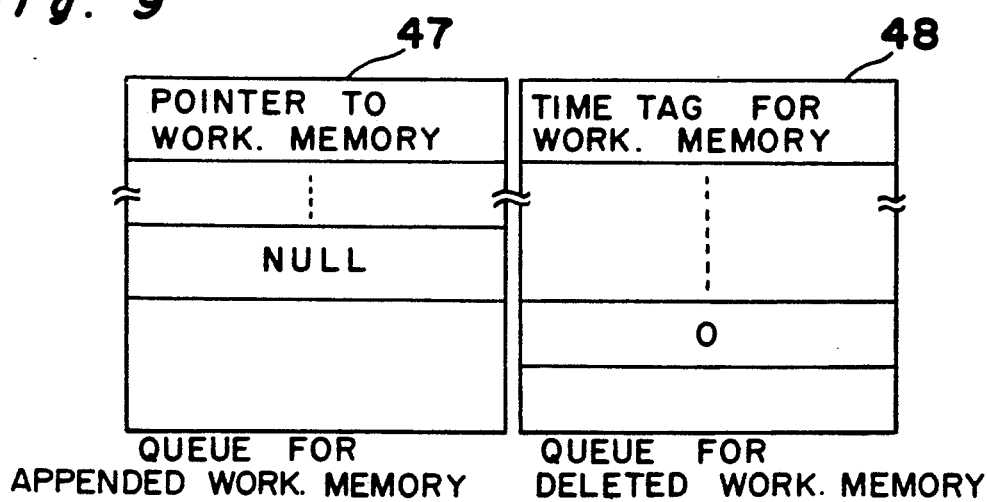
FIG. 9 is a block diagram of a data queue of the modified working memory in the interpreter-type rule processor of the inference processor.

FIG. 9 shows the internal construction of the variable working memory 31 shown in FIG. 6 wherein 47 is a queue storing pointers to newly appended working memory during the inference processing cycle, and 48 is a queue storing time tags for working memory deleted during the inference processing cycle.

Figure 10:
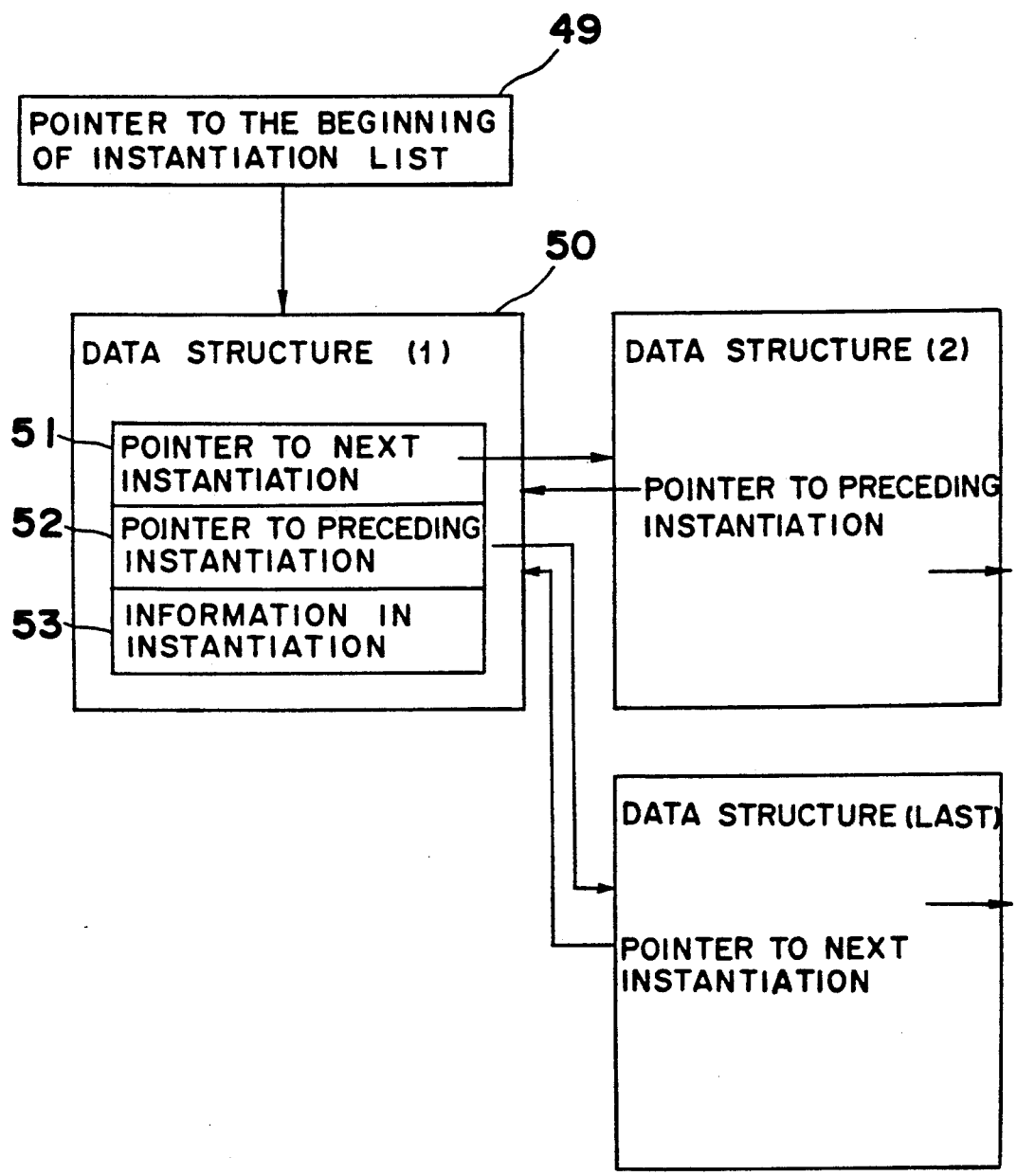
FIG. 10 is a block diagram of a data structure of an instantiation in the interpreter-type rule processor of the inference processor.

FIG. 10 shows the internal structure of the instantiation memory 32 shown in FIG. 6 wherein 49 is a pointer to the beginning of the data structure of an instantiation contained in the instantiation memory 32; 50 is a data structure expressing the instantiations in primary computer memory; 51 is a pointer to the instantiation in the instantiation memory 32 following the instantiation wherein is contained the pointer; 52 is a pointer to the instantiation in the instantiation memory 32 preceding the instantiation wherein is contained the pointer; and 53 is a range storing the internal information of the instantiation. By using this structure, rules can be deleted and appended during the inference process without generating contradictions as will be described herein below with reference to FIGS. 11 and 12.

Figure 11:
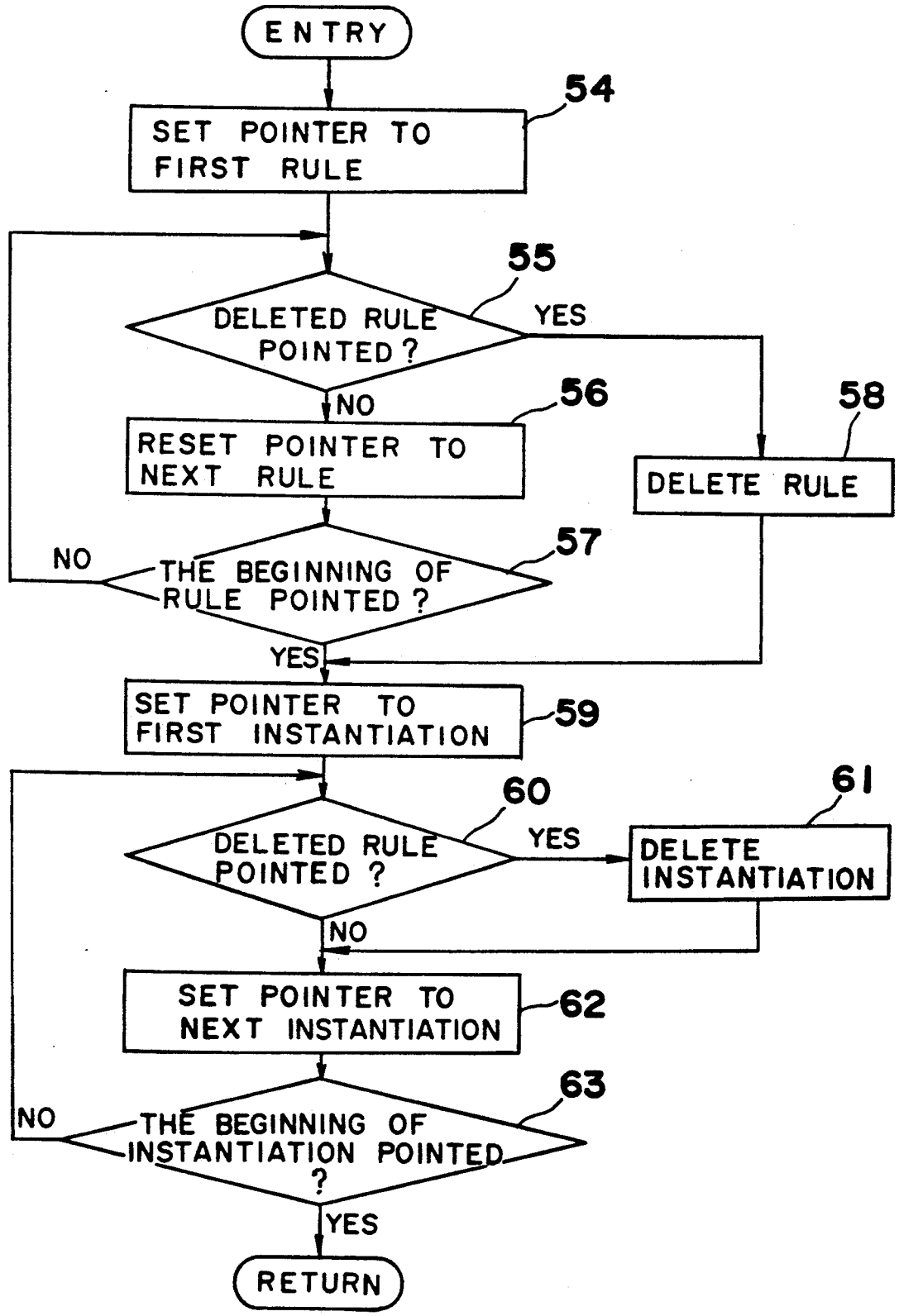
FIG. 11 is a flow chart showing the operation of rule deletion in the interpreter-type rule processor of the inference processor.

FIG. 11 shows the flow procedure for the steps used for rule deletion in the rule manager 28 during the inference process. When a rule delete request is received during inference processing, the search pointer is set to the pointer 33 to the first rule in the production memory 27 to find the corresponding rule (step 54). Next, it is examined whether the rule pointed to by the current search pointer is the rule to be deleted (step 55). If the current search pointer is not equal to the rule to be deleted, the search pointer is reset to the next rule (step 56). It is then evaluated whether the search pointer is pointing to the beginning of the rule; if the pointer is not reset to the beginning of the rule, step 55 is re-executed; if the pointer is set to the beginning of the rule, the next step in the procedure is advanced to. If the current pointer is pointing to the rule to be deleted, the data structure 34 for that rule is deleted from the production memory 27, and the next step is advanced to (step 58). To delete a rule it is sufficient to simply change the values of the pointers of the rules preceding and following the deletion rule using the pointers 35, 36 linking the data structure 34 of the rule. After deleting the data structure of the rule, the data structure 50 for instantiations storing information which can invoke that rule are deleted.

To search the instantiation memory 32, the search pointer is set to the pointer 49 to the first instantiation (step 59). Next, by examining the internal information 53 of the instantiations, rules which match the information stored in the instantiation pointed to by the search pointer are examined for equality with the deleted rule (step 60). If it is equal to the deleted rule, the data structure 50 for that instantiation is deleted (step 61). To delete the data structure, it is sufficient to simply change the value of the pointers of the instantiations preceding and following the instantiation to be deleted using the pointers 51, 52 linking the data structure 50 of the instantiation. The value of the search pointer is then changed to point to the next instantiation (step 62). It is then evaluated whether the value of the search pointer has been reset to the beginning of the instantiation (step 63), and if it has not, processing is repeated from step 60. If the pointer has been reset to the beginning of the instantiation, processing is terminated.

Figure 12:
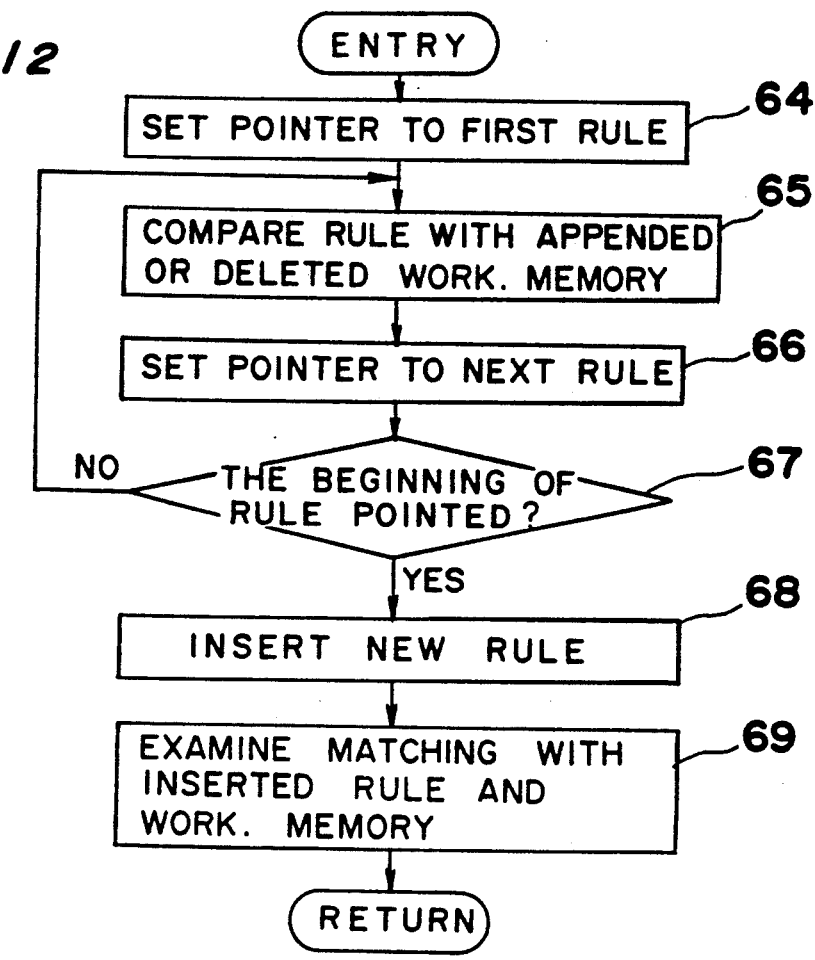
FIG. 12 is a flow chart showing the operation of rule addition in the interpreter-type rule processor of the inference processor.

FIG. 12 shows the steps in the procedure used to add a rule during inference processing in the rule manager 28. The search pointer is set to the pointer 33 to the first rule (step 64) in order to compare the rules in the production memory 27 before rule additions with the deleted working memory 48 and the newly appended working memory 47 stored in the variable working memory 31 before the point at which the rule was added.

Next, the rule pointed to by the search pointer is compared with the newly appended working memory 47 and the deleted working memory 48 (step 65), and the search pointer is advanced to the next rule (step 66). It is determined whether the search pointer has been reset to the beginning of the rule; if it has not, the procedure returns to step 65, and if it has, advances to the next step. The data structure 34 for the newly added rule is generated, and inserted to the beginning of the rule list in the production memory 27 (step 68).

Finally, appended rules are compared with the data structures 42 in all working memories in the working memory 29 (step 69).

Thus, according to the inference processor as discussed in this embodiment, by providing in the interpreter-type rule processor a rule manager which manages the production memory based on the contents of the working memory and the instantiation memory, processing to append or delete rules during the inference process can be executed without creating contradictions in the inference process preceding or following thereto.

A third embodiment of the present invention is described herein below, which uses the same construction and internal data structure as those of the inference processor shown in FIG. 6 to FIG. 10 with reference to the second embodiment described herein above.

Figure 13:
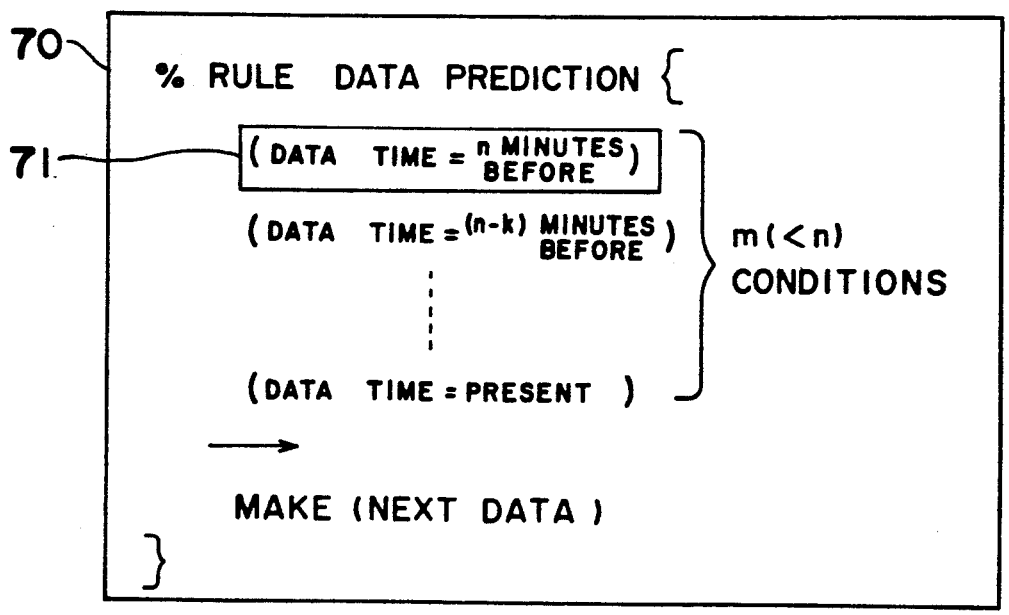
FIG. 13 is a diagram showing a rule statement used in the interpreter-type rule processor of an inference processor according to a third embodiment of the present invention.

In an interpreter-type rule processor constructed as described above, high speed inference processing can be executed as described hereinbelow by using a time series characteristic between the conditions of the rules being implemented. FIG. 13 shows the structure used for rules stored in the rule file 24 wherein 70 is one rule statement; the statement comprises "%rule" as the rule declarator, the rule name, conditional, an arrow→ separating conditional and conclusion, and the conclusion. In rule 70, 71 shows one conditional statement contained in rule 70; the conditional statement comprises the name of the working memory for which the fulfillment of its conditions is required, and a list of the conditions to be fulfilled. In the matching operation executed by the inference engine 30, to improve the speed of the inference processing when each condition for each rule is examined for condition matching against all working memories, a time tag (each having a constant value in each working memory) showing the order in which the working memory was generated is stored with the internal information 37 of the rule in the production memory 27 for those working memories which match the conditions; to determine whether the entire rule is satisfied, the consistency between conditions is examined for combinations of working memories stored therein with a time tag. In other words, if it is assumed that rule 70 has m conditions 71, and that for each of the current conditions 71 there are d working memories which satisfy the condition 71, it is necessary to examine the consistency between conditions d to the exponent m times. However, when as shown in FIG. 13 the conditions 71 in a rule 70 have a time series-based correlative relationship wherein any working memory which satisfies all conditions 71 precedent thereto must be generated before all successive working memories which satisfy the conditions thereof, this relationship can be used by the inference engine 30 during condition matching to reduce the number of combinations for which conditional coherency examination must be considered to dCm (where C is the combinations), thereby achieving an increase in inference speed compared with a similar operation in which this relationship is not used.

Thus, according to this embodiment of the present invention, by providing an inference engine which uses a time series characteristic between the conditions of rules to be implemented in inference processing for rule matching, a high inference processing speed can be achieved.

As described hereinabove, an inference processor according to the present invention includes a compiler-type rule processor and an interpreter-type rule processor. The compiled rule processor comprises a rule file for storing user-defined rules, a rule compiler for expanding the rules into a rule network, a production memory for storing the compiled rules, a working memory for storing intermediate inference processing results, and an inference engine which uses these other components for inference processing. The interpreter-type rule processor comprises a rule file for storing user-defined rules, a rule interpreter for successively interpreting said rules, a production memory for storing the contents of the interpreted rules, an inference engine which uses the production memory for inference processing, and a working memory for storing intermediate inference processing results. The inference processor having the above-described construction can generate from the rule file by means of the rule compiler a data consistency holder to maintain the consistency of the data shared by the compiler-type rule processor and the interpreter-type rule processor.

Furthermore, by providing a rule manager for updating the contents of the production memory in the interpreter-type rule processor from outside the rule processor without creating contradictions, it is possible to append and delete rules during the inference processing operation.

Furthermore, by providing an inference engine which uses a time series characteristic between the conditions of rules to be implemented in the interpreter-type rule processor, high speed inference processing can be achieved.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An inference processor comprising:
   a compiler-type rule processor comprising:
   a rule file for storing user-defined rules;
   a rule compiler for expanding said rules into a rule network;
   a production memory for storing compiled rules;
   a working memory for storing intermediate inference processing results; and
   an inference engine which makes an inference by using said production memory and said working memory;
   an interpreter-type rule processor comprising:
   a rule file for storing user-defined rules;
   a rule interpreter for successively interpreting said rules;
   a production memory for storing interpreted rules;
   an inference engine which uses said production memory for inference processing; and
   a working memory for storing intermediate inference processing results; and
   a data consistency holder for maintaining, based on the rule files of both said compiler-type and interpreter-type rule processors, the consistency of data used in common by said compiler-type rule processor and said interpreter-type rule processor by matching the data when said data consistency holder is started by said compiler-type ruler processor and said interpreter-type rule processor after inference processing is completed by both said compiler-type and interpreter-type rule processors.

2. The inference processor according to claim 1, wherein said inference processor comprises a rule manager to refresh the contents of said production memory in said interpreter-type rule processor from outside said intterpreter-type rule processor without making any logical contradictions in the contents of said production memory.

3. The inference processor according to claim 1, wherein said inference engine of said interpreter-type rule processor uses a time series characteristic between conditions of said rules being implemented.

4. An inference processing system comprising:
first and second rule files for storing respective user-defined rules;
a rule compiler for generating conversion functions using said user-defined rules stored in said first rule file and for expanding said user-defined rules stores in said first rule file into a rule network; and
a rule processor which receives said conversion functions and rule network from said rule compiler and which receives said user-defined rules stored in said second rule file and which includes
a compiler-type rule processor including (a) a first production memory for storing the rule network received from said rule compiler, (b) a first working memory for storing first intermediate inference processing results and (c) a first inference engine for executing a first inference processing using said first production memory and said first working memory,
an interpreter-type rule processor including (a) a rule interpreter for successively interpreting said user-defined rules received from said second rule file, (b) a second production memory for storing interpreted rules obtained by said rule interpreter, (c) a second working memory for storing second intermediate inference processing results, and (d) a second inference engine for executing a second inference processing using said second production memory and said second working memory, and
a data consistency holder, formed of said conversion functions received from said rule compiler, for linking said first and second working memories using said conversion functions;
wherein said rule compiler includes means for generating said conversion functions when a user-defined rule to be processed from said first rule file is directed to data of said first working memory of said compiler-type rule processor and shared with said second working memory of said interpreter-type rule processor, and wherein the thus generated conversion functions are for converting the data used by said respective interpreter-type rule processor and said compiler type rule processor to maintain the consistency of the data shared by said compiler-type rule processor and said interpreter-type rule processor.

5. The inference processor system according to claim 4, wherein said rule interpreter comprises a rule manager to refresh contents of said second production memory from outside said interpreter-type rule processor without making any logical contradictions in the contents of said second production memory.

6. The inference processor according to claim 4, wherein said second inference engine uses a time series characteristic between conditions of said rules being implemented.

* * * * *